United States Patent [19]

Tachibana et al.

[11] 4,122,515
[45] Oct. 24, 1978

[54] HIGH HARMONIC CURRENT REDUCING APPARATUS IN POWER CONVERTER

[75] Inventors: Kyozo Tachibana, Ibaraki; Takashi Tsuboi, Katsuta; Yutaka Suzuki, Hitachi; Mitsugu Matsutake, Hitachi; Shozuchi Miura, Hitachi; Shigeru Hatano, Hitachi; Takao Goto; Yoshio Nozaki, both of Katsuta, all of Japan

[73] Assignee: Hitachi, Ltd., Japan

[21] Appl. No.: 657,270

[22] Filed: Feb. 11, 1976

[30] Foreign Application Priority Data

Feb. 15, 1975 [JP] Japan .................................. 50-19346

[51] Int. Cl.² ........................................... H02M 1/12
[52] U.S. Cl. ...................................... 363/45; 363/58; 363/68
[58] Field of Search ................. 321/9 R, 25, 27 R, 47, 321/69 R; 318/345 C, 345 R; 363/57, 58, 68, 129, 44, 45

[56] References Cited

U.S. PATENT DOCUMENTS

| | | |
|---|---|---|
| 3,292,072 | 12/1966 | Hylten-Cavallius et al. ........ 321/9 R |
| 3,321,695 | 5/1967 | Augier ..................... 321/25 |
| 3,332,000 | 7/1967 | Greening et al. ............... 318/345 C |
| 3,355,654 | 11/1967 | Risberg ........................ 363/129 X |
| 3,487,287 | 12/1969 | Demarest ....................... 321/47 |
| 3,808,510 | 4/1974 | Dubrovin ....................... 321/25 |
| 3,863,119 | 1/1975 | Tashibana ...................... 321/27 R |
| 4,030,018 | 6/1977 | Tsuboi ......................... 363/68 |

FOREIGN PATENT DOCUMENTS

| | | | |
|---|---|---|---|
| 527,626 | 10/1956 | Fed. Rep. of Germany ........ | 321/27 R |
| 1,204,319 | 11/1965 | Fed. Rep. of Germany ........ | 321/27 R |
| 41,332 | 12/1970 | Japan ......................... | 321/47 |
| 64,122 | 11/1941 | Norway ........................ | 321/27 R |
| 1,253,423 | 11/1971 | United Kingdom ................ | 321/27 R |

*Primary Examiner*—William M. Shoop
*Attorney, Agent, or Firm*—Craig & Antonelli

[57] ABSTRACT

This invention is applied to a power converter with a converting apparatus comprising one or more units including only controlled rectifiers or combination of controlled rectifiers and non-controlled rectifiers, said converting apparatus being connected with an AC power source, whereby high harmonic currents generated in the AC circuit during commutating periods are reduced.

In the present invention, at the commutating period of the converting apparatus, the reactance in the AC circuit of the converter is changed to increase in accordance with change of the AC current of the converting apparatus, so that the change of the AC current during the commutating period is made more slowly thereby reducing high harmonic currents.

5 Claims, 17 Drawing Figures

HIGH HARMONIC CURRENT REDUCING APPARATUS IN POWER CONVERTER

BACKGROUND OF THE INVENTION

The present invention relates to a high harmonic current reducing apparatus in a power converter with a converting apparatus comprising rectifiers and being connected with an AC power source, for reducing high harmonic currents generated in the AC circuit of the converter during commutating periods.

The power converter of this type has a high efficiency of power conversion and thus has been applied to many systems of various power conversion capacity. An example of such applications is an electric car.

In general, switching operation of turning-on or turning-off the current flow is an essential function of the controlled or non-controlled rectifiers used in the power converter.

For this reason, the AC current abruptly changes at the time of commutation. The abrupt change of AC current is accompanied by high harmonic currents. The high harmonic currents produce noise voltages in other electric systems such as, for example, communication cables. That is, it provides a problem of inductive interference.

In this kind of power converter, it is impossible to avoid the problem of inductive interference caused by commutation. One conventional countermeasure for this problem is that some modification for reducing noise voltage is made in the apparatus which are subject to such an inductive interference. Another countermeasure is that a plurality of power converters are used with the DC sides being connected in series to gradually increase the output voltage so that the noise voltage is reduced. The former countermeasure is disadvantageous in that the problem of inductive interference arising from the power converter is not solved, but adversely additional high cost for such a countermeasure is necessary. The latter countermeasure using a plurality of power converters may solve that problem to some extent, but it is insufficient to reduce high harmonic components of an AC current which also cause inductive interference.

The factors determining the high harmonic components of the AC current in the power converter have been studied by the inventors.

The equivalent interference current $J_p$ causing the inductive interference is related to the effective value of high harmonic components of the AC current in the power converter and is represented by the following equation $$J_p = \sqrt{\sum_{n=1}^{\infty} (Sn \cdot In)^2} \quad (1)$$

where $Sn$ designates the weight of the respective frequencies and is called the noise evaluation coefficient, and $In$ the effective value of high harmonic components.

The inventors noticed that there might be some relation between the equivalent interference current $J_p$ and the AC current of the power converter, because, in the operation (1), the effective value $In$ of high harmonic components may be developed into a Fourier series, if the primary current waveform is known.

Further, the inventors notices that the equivalent interference current $J_p$ changed in accordance with the change of the control angle of the rectifier.

A test was conducted on the relationship between the change of the AC current waveform of the converter and the variation of the equivalent interference current $J_p$, when the control angle of the rectifier was changed. As a result of the test, it was ascertained that there was a particular relationship therebetween. That is, it was found that the change of the AC current waveform due to the commutation in accordance with the control angle in the case of a small equivalent interference current $J_p$ was slower than that in case of a large equivalent interference current $J_p$.

This relationship shows that, if the change of the AC current waveform at the commutation is slow, the equivalent interference current $J_p$ causing an inductive interference is effectively reduced.

SUMMARY OF THE INVENTION

Accordingly, an object of the present invention is to provide a high harmonic current reducing apparatus in a power converter for reducing an inductive interference arising from high harmonic currents generated during the commutating period of the converter.

The feature of the present invention is that, in a power converter comprising one or more converting circuits connected with an AC power source, each converting circuit consisting of controlled rectifiers or a combination of controlled and non-controlled rectifiers, the reactance of the AC circuit portion of at least one converting circuit from an AC power source to the converting circuit is made different from the reactance of the remaining converter circuits, thereby reducing the harmonic currents generated.

Other objects and features of the present invention will be apparent from the following description in connection with the accompanying drawings.

DESCRIPTION OF THE PREFERRED EMBODIMENTS

Figure 1:
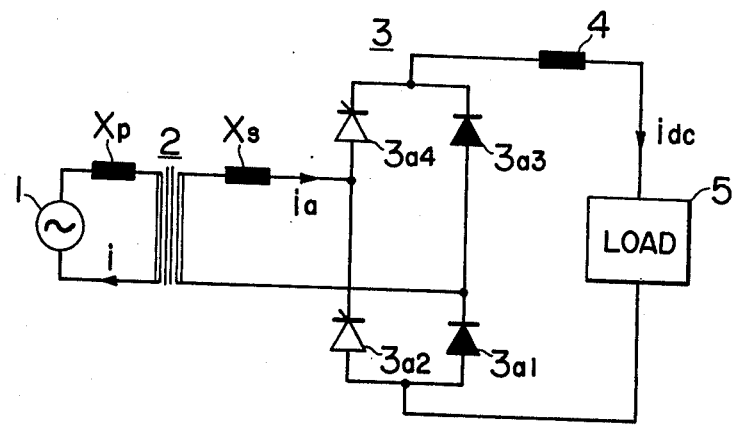
FIG. 1 is a schematic circuit diagram of one form of power converters to which the present invention is applied.

Referring now to FIG. 1, there is shown an example of power converters to which the present invention is applied. In FIG. 1, an AC voltage from an AC power source 1 is applied to a rectifier circuit 3 through a transformer 2. The rectifier circuit 3 serves to convert the AC voltage to a DC voltage which in turn is fed to a DC load 5 through a smoothing reactor 4 for absorbing the ripples of a load current $i_{dc}$ and smoothing it.

The rectifier circuit 3 is of a single phase bridge rectifier circuit constituted by a pair of controlled rectifiers (hereinafter referred to simply as thyristors) $3_{a2}$ and $3_{a4}$ and a pair of non-controlled rectifiers (hereinafter referred to simply as diodes) $3_{a1}$ and $3_{a3}$, these pairs of rectifiers being arranged in bridge connection. This rectifier circuit 3 is well known. It is noted, of course, that the rectifier circuit 3 may be constructed by using thyristors for all the rectifiers.

$X_p$ designates a reactance provided between the primary side of the transformer 2 and the AC power source 1, and $X_s$ designates a reactance between the secondary side of the transformer 2 and the rectifier circuit 3.

In this circuit, the equivalent interference current $J_p$ as mentioned above referring to the equation (1) is substantially represented by an effective value of high frequency components $I_n$ of the primary current of the transformer. The rectifier circuit 3 is of a single phase bridge circuit, and thus the equivalent interference current $J_p$ may be estimated by either waveform of the primary current $i$ or the secondary current $i_a$ of the transformer 2.

Figure 2:
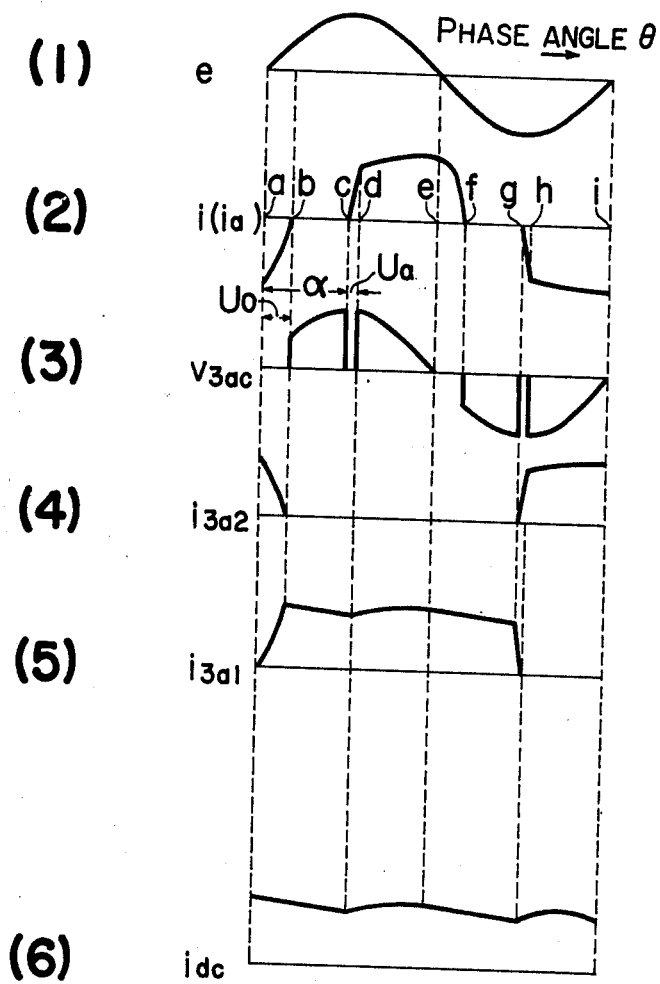
FIGS. 2 and 3 are diagrams showing a set of waveforms and a circuit for explaining the operation of the power converter in FIG. 1.

FIG. 2 shows waveforms for explaining the operation of the device of FIG. 1 when the phase angle or control angle for firing the thyristors in the rectifier circuit 3 of FIG. 1 is 90°. In this figure, (1) illustrates a voltage waveform of the AC power source 1, (2) current waveforms of the AC current $i$ (or $i_a$), (3) voltage waveforms across the reactance $X_p$, (4) current waveforms flowing through the thyristor $3_{a2}$, (5) a current waveform flowing through the diode $3_{a1}$, and (6) a current waveform of the load current $i_{dc}$.

As shown in FIG. 2 (2), the change of the AC current $i$ takes remarkably the form of a square in the waveform at the time of commutation to the thyristors or the diodes. The period of commutation to thyristors is designated by c-d and g-h, while the period of commutation to diodes is designated by a-b and e-f. It is at the points b, c, d, f, g and h that change of the current $i$ in the form of a square takes place. One of the reasons why the current change takes the form of a square at the time of commutation to the thyristors and the diodes is that the reactance of the AC circuit where the AC current changes is constant during the short periods of $u_o$ and $u$ of the overlapping angles necessary for the commutation.

It is for this reason that, in this invention, in order to reduce the high frequency components of the AC current, the reactance of the AC circuit is made to change in accordance with the current change at the time of commutation to the thyristors or the diodes thereby to possibly minimize the current change.

Before proceeding with the description of detail embodiments of the present invention, the commutating operation of the circuit of FIG. 1 will be described for better understanding of the present invention.

In the bridge rectifier circuit constructed by the thyristors and the diodes of the type as shown in FIG. 1, the commutating operation is classified into two types: one takes place when the diodes naturally initiate conduction; the other takes place when the thyristors $3_{a2}$ and $3_{a4}$ are fired by a firing means (not shown). The former corresponds to the commutations occuring during the periods of a-b and e-f in FIG. 2, and the latter corresponds to the commutations during the periods of c-d and g-h in FIG. 2 (2).

An explanation will be made about the commutating operation of the rectifier circuit by using the commutating periods of a-b and g-h examples.

Figure 3:
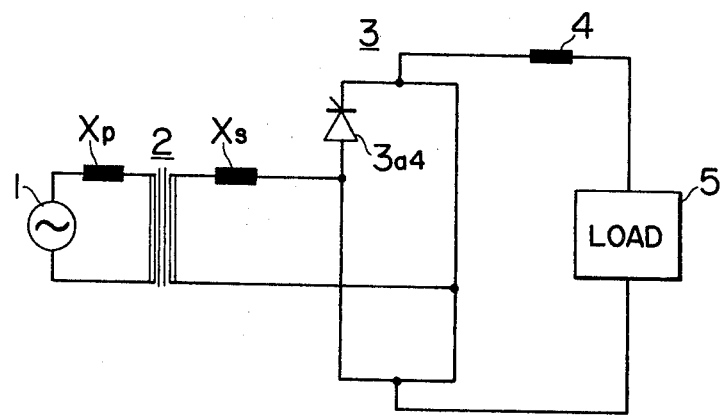

First, an explanation about the commutating operation during the period of a-b will be given. Before the point a, the thyristor $3_{a2}$ and the diode $3_{a3}$ are in conduction and the load current $i_{dc}$ is flowing through the DC load 5. At the point a where the voltage across the AC power source 1 is zero, the diode $3_{a1}$ naturally initiates conduction. For this, the thyristor $3_{a1}$ and the diodes $3_{a1}$ and $3_{a3}$ are short-circuited and, in this case, the circuit of FIG. 1 is equivalently represented by the circuit of FIG. 3. Under this condition, the AC power source 1 is short-circuited at the rectifier circuit 3, as shown in FIG. 3. Therefore, the AC current $i$ in the AC circuit changes irrespectively of the DC current $i_{dc}$ in the DC circuit. The AC current $i$ at this time is given by the following equation;

$$X_c \frac{di}{d\theta} = e \qquad (2),$$

where $X_c$ is reactance existing in the AC circuit, and $\theta$ is phase angle.

In this case, the AC power source 1 is in a postive polarity and thus the AC current $i$ tends to change from a negative to a positive polarity, as shown in FIG. 2 (2). Correspondingly, the current $i_{3a2}$ of the thyristor $3_{a2}$ decreases from the positive side, as shown in FIG. 2 (4) and the current $i_{3a1}$ of the diode $3_{a1}$ increases from zero, as shown in FIG. 2 (5). Then, the phase angle $\theta$ reaches the point b and, at this time, the current $i_{3a2}$ becomes zero while the current $i$ also becomes zero thereby to complete the commutation.

Next, an explanation will be made about the commutating operation during the period of g-h. Before the g point, the diodes $3_{a1}$ and $3_{a3}$ are conducting and the AC current $i$ is zero. At the point g, the thyristor $3_{a2}$ is fired to conduct, and the circuit of FIG. 1 becomes equivalent to the circuit shown in FIG. 3. Accordingly, also in this case, the AC current $i$ changes in accordance with the equation of (2). In this case, however, the polarity of the power source voltage $e$ is negative so that the AC current $i$ steeply changes in the negative direction, as shown in FIG. 2 (2). In accordance with this change of the AC current, the current $i_{3a1}$ of the diode $3_{a1}$ steeply decreases, as shown in FIG. 2 (5) while the current $i_{3a2}$ of the thyristor $3_{a2}$ rapidly increases, as shown in FIG. 2 (4). Then, the phase angle reaches the point h and the current $i_{3a1}$ of the diode $3_{a1}$ becomes zero. At the same time, the current $i_{3a2}$ of the thyrsitor $3_{a2}$ reaches the load current $i_{dc}$ in value, and the AC current $i$ also reaches the load current $i_{dc}$. In this manner, the commutation is completed.

As described above, the AC current $i$ during the commutating period of the rectifier circuit 3 is changed in accordance with the equation (2). This change of the AC current $i$ is large because the value of the reactance $X_c$ of the AC circuit is generally small. Accordingly, the waveform of the AC current $i$ takes the form of a square at the phase angles $b$ and $g$ shown in FIG. 2 (2). In the case of the power converter using a smoothing reactor 4 as shown in FIG. 1, the AC current $i$ changes with a rectangular waveform and therefor the AC current $i$ takes the form of a square even at the phase angle $h$. This is true at the other points $c$, $d$ and $f$.

When analized the waveform of the AC current which exhibits such a form of a square during the commutation period, there is observed a frequency spectrum containing various frequencies in the AC current. From this, it will be seen that the AC current includes large high harmonics.

Figure 4:
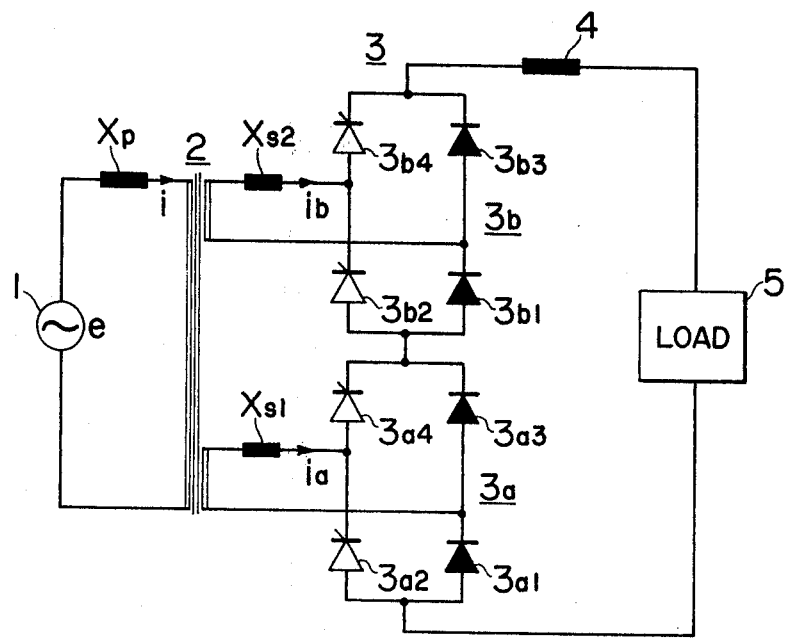
FIG. 4 shows another example of power converters to which the present invention is applied.

Incidentally, the above-mentioned problem of inductive interference is caused not only in a power converter using a single rectifier circuit such as shown in FIG. 1 but also a power converter using a plurality of rectifier circuits. An example of such a power converter with a plurality of rectifier circuits is shown in FIG. 4 in which two sets of rectifier circuits are employed. In FIG. 4, a rectifier circuit system 3 is comprised of a bridge circuit including a pair of thyristors $3_{a2}$ and $3_{a4}$ and diodes $3_{a1}$ and $3_{a3}$, and another bridge circuit including thyristors $3_{b2}$ and $3_{b4}$ and diodes $3_{b1}$ and $3_{b3}$. The DC sides of the bridge circuits is connected in series. The DC output voltage produced by such rectifier circuit system 3 is controlled in the following manner. First, the control angles of the thyristors $3_{a2}$ and $3_{a4}$ in the rectifier circuit $3_a$ are continuously controlled for increasing the output voltage. When control angles of the thyristors $3_{a2}$ and $3_{a4}$ reach 0°, the output voltage of the circuit $3_a$ is maintained as it is, and then the control angles of the thyrsitors $3_{b2}$ and $3_{b4}$ in the rectifier circuit $3_b$ are continuously controlled for further increasing the output voltage.

Figure 5:
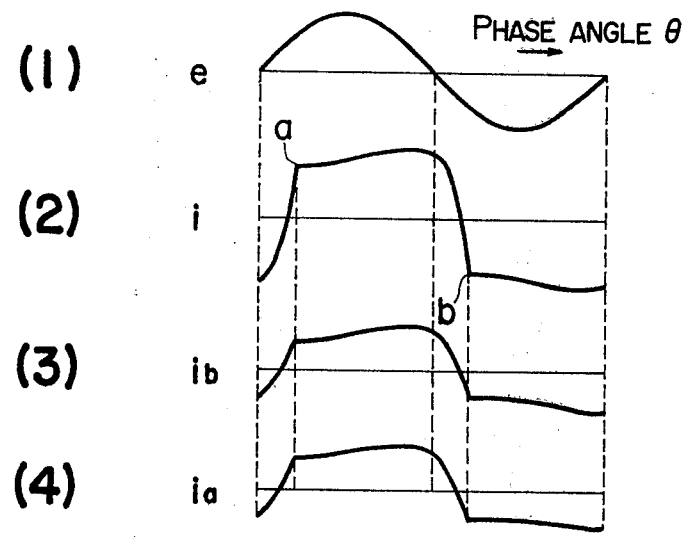
FIG. 5 shows waveforms for explaining the operation of the device of FIG. 4.

FIG. 5 shows the relationship of the power source voltage $e$ and the AC current $i$, and illustrates such a condition that the control angles of the thryistors in both the circuits $3_a$ and $3_b$ are zero, that is, the circuit condition where the rectifier circuits $3_a$ and $3_b$ operate as full-wave rectifier circuits. As shown in FIG. 5 (3) and (4), AC currents $i_a$ and $i_b$ of the rectifier circuits $3_a$ and $3_b$ take identical current waveforms. The total AC current $i$ is the sum of the currents $i_a$ and $i_b$, as shown in FIG. 5 (2). Here, points $a$ and $b$ designate the time when the commutation is completed, and sharp changes in the current waveform are caused at these points. Namely, the AC current $i$ takes the form of a square at these points.

In this way, even if the power converter is of the type as shown in FIG. 4, the AC current includes high harmonic components at the time of commutation.

The present invention has been made in consideration of the above-mentioned change of the AC current so that the reactance of the AC circuit to which the equation (2) is applicable tends to increase during the commutating period of the rectifier circuit so as to make the AC current change slowly during the commutation period.

Figure 6:
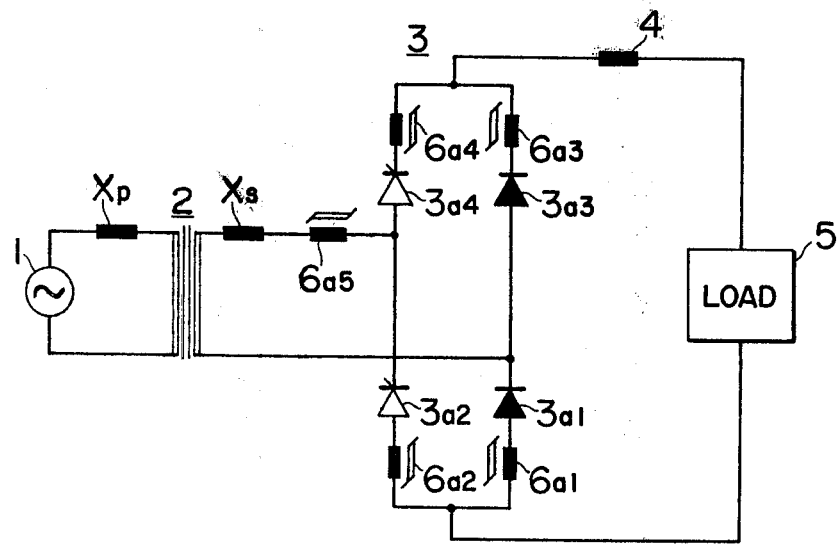
FIG. 6 shows an embodiment of the present invention which is applied to the circuit of FIG. 1.
Figure 7:
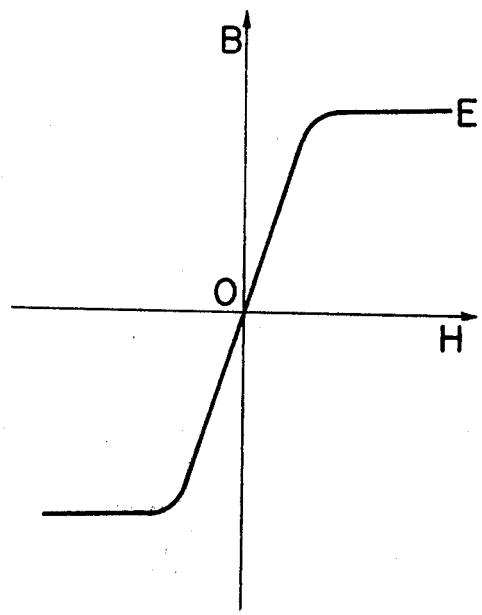
FIG. 7 is a graph illustrating the characteristic of a saturable reactor used in the embodiment of FIG. 6.

FIG. 6 shows an embodiment of the power converter when the present invention is applied to the circuit of FIG. 1. The feature of the instant embodiment resides in the employment of saturable reactors of which the inductance is continuously changeable with respect to a current change. In FIG. 6, saturable reactors $6_{a1}$, $6_{a2}$, $6_{a3}$ and $6_{a4}$ are associated with thyristors $3_{a2}$ and $3_{a4}$ and diodes $3_{a1}$ and $3_{a3}$ in series connection, respectively, and a saturable reactor $6_{a5}$ is connected with the AC circuit of the rectifier circuit 3. The circuit construction other than the employment of these saturable reactors is the same as that of FIG. 1. The iron core of each of the saturable reactors $6_{a1}$ to $6_{a5}$ has a magnetomotive force H versus magnetic flux density B characteristic (hereinafter referred to as B-H characteristic) with a saturation characteristic of smooth curve as shown in FIG. 7. Assuming now that, in the thus constructed circuit, the thyristor $3_{a4}$ is fired, for example, at the point $c$ in FIG. 2, and it is changed in the operating condition from nonconduction to conduction. At this time, the saturable reactors $6_{a5}$ and $6_{a4}$ initiates excitation, and the amount of the magnetic excitation of the respective reactors chnages from O to E as shown in FIG. 7. Since the B-H characteristic curve is steep at the initial stage, the inductance of the saturable reactor is large in value and thus the increase of the AC current $i$ and the current of the thyristor $3_{a4}$ is suppressed. The magnetic flux density B successively increases to saturation. On this saturation, the inductance of the saturable reactor decreases and, hence, the AC current $i$ and the current of thyristor $3_{a4}$ rapidly increase. In this case, if the B-H characteristic of the saturable reactor is designed to have a smooth curve as shown in FIG. 7, the current increase also traces a smooth curve. On the other hand, the current of the diodes $3_{a3}$ decreases contrary to the increase of the current of the thyristor $3_{a4}$. Therefore, the amount of magnetic excitation of the saturable reactor $6_{a3}$ decreases from E toward O along the characteristic curve of FIG. 7. Since the magnetic excitation decreases at an initial stage along the saturation portion of the magnetic flux, there is a little restriction of the current $i$. The amount of magnetic excitation progressively decreases, and then the magnetic flux density B reaches the non-saturation region where the saturable reactor $6_{a3}$ has a large inductance, thereby resulting in a slow decrease of current. In this case, if the B-H characteristic of the saturable reactor is designed to have the saturation characteristic of a smooth curve as shown in FIG. 7, the current of the diodes $3_{a3}$ decreases tracing such a smooth curve. In this way, the current flowing through the diodes $3_{a3}$ is finally shifted to the thyristor $3_{a4}$. The change of the AC current $i$ is caused due to such a commutating operation. In this case, the current changes of the thyristor $3_{a4}$ and the diode $3_{a3}$ are slow, the AC current $i$ also changes smoothly. As a result, a current change having the curve appearing at the points $c$ and $d$ of FIG. 2 is caused. On the other hand, the curve at the point $f$ of FIG. 2 appears at the transient time from the saturation to the non-saturation region of the saturable reactor $6_{a4}$ when the current of the thyristor $3_{a4}$ decreases again. The curves at the points $g$, $h$ and $b$ of FIG. 2 appear at electrical angles out of 180° from the points $c$, $d$ and $f$ and are produced through the action of saturable reactors $6_{a5}$, $6_{a1}$ and $6_{a2}$.

In the embodiment of FIG. 7, the saturable reactor causes the change of the AC current at the commutation to be slow, thereby effectively reducing the high frequency components. However, in this embodiment, the commutating operation is slow.

Figure 8:
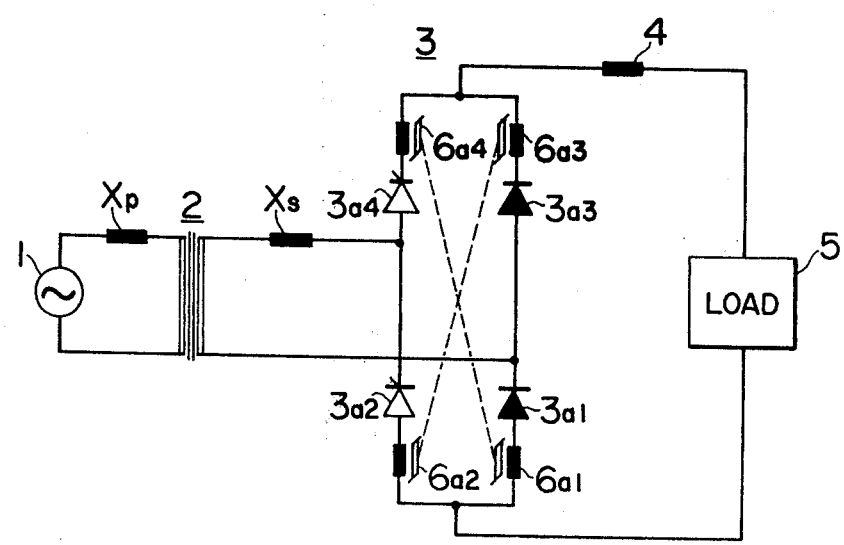
FIG. 8 shows a modification of the embodiment shown in FIG. 6.

This disadvantage is solved by the embodiment of FIG. 8. In the circuit shown in FIG. 8, the difference from the circuit of FIG. 6 is that the saturable reactor $6_{a5}$ is omitted and the saturable reactors $6_{a1}$ and $6_{a4}$, and $6_{a2}$ and $6_{a3}$, each pair of which are connected in the opposite sides of the bridge connection, are magnetically coupled with each other, respectively. In this circuit, when the rectifier output voltage is maximum, i.e., the control angle $\alpha$ is zero, the instantaneous currents flowing through the diode $3_{a1}$ and the thyristor $3_{a4}$ or the thyristor $3_{a2}$ and the diode $3_{a3}$ are identical. Accordingly, under this condition, the electromotive forces of the saturable reactors are canceled by each other by the two windings with the result that these reactors each exhibit no inductance to the current flowing therethrough. Therefore, the maximum rectifying capability of the rectifier circuit 3 is by no means reduced in comparison with the conventional one. It is to be noted, of course, that, for reducing high harmonic components, the saturable reactors $6_{a1}$ and $6_{a2}$ connected in series with the diodes alone or the saturable reactor $6_{a5}$ alone may be used.

Figure 9:
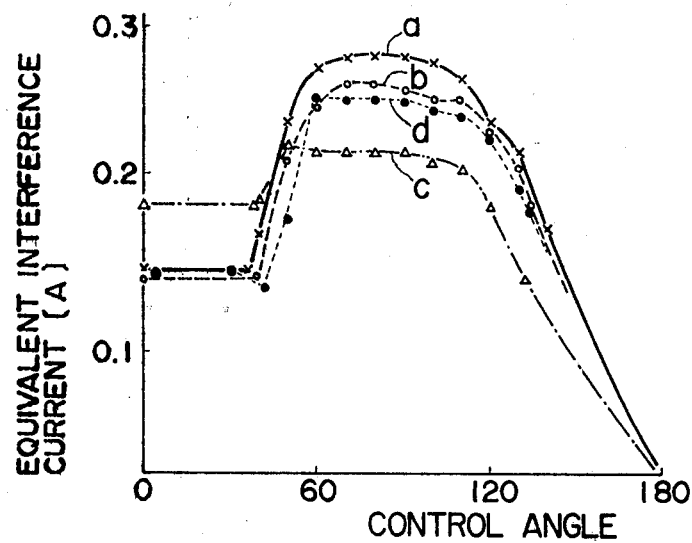
FIG. 9 illustrates graphs tracing measurements of the characteristics of the power converters when saturable reactors are inserted in connection into the circuits of the power converters.

FIG. 9 shows measurements of high harmonic components of the AC current when the saturable reactor is inserted in the circuit. In FIG. 9, $a$ shows a characteristic curve of the circuit of FIG. 1 where no saturable reactor is used, $b$ that of the circuit of FIG. 6 when only the saturable reactors $6_{a1}$ and $6_{a3}$ are used, $c$ that of the circuit of FIG. 6 when only the saturable reactor $6_{a5}$ is used, and $d$ that of the circuit of FIG. 8. From those characteristic curves, it will be seen that the high frequency components may be reduced if the change of the AC current is made slowly at the commutation of the rectifier circuit.

Figure 10:
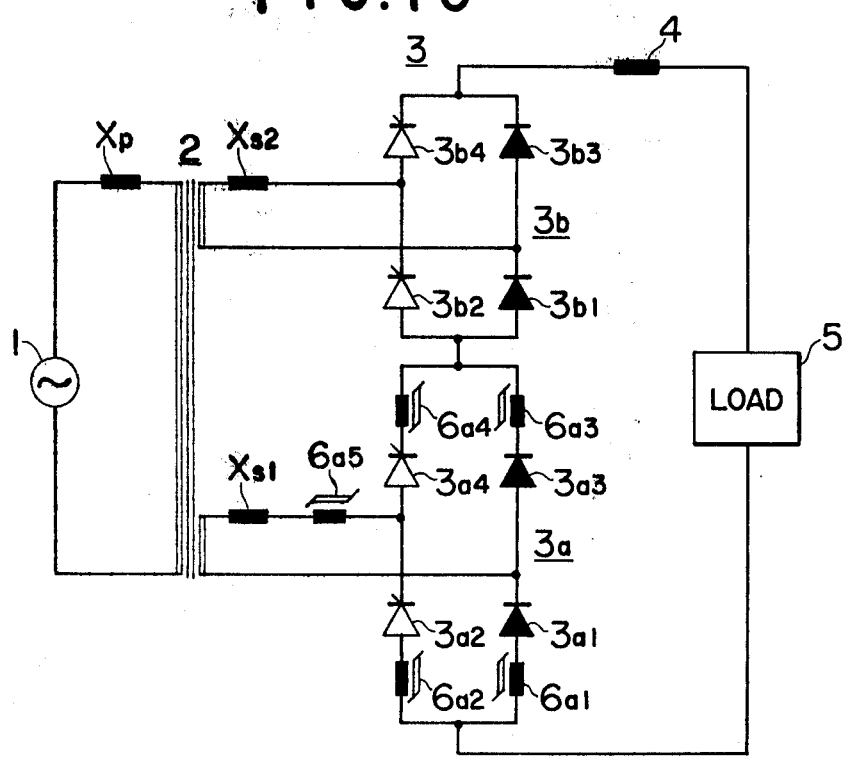
FIG. 10 is a circuit diagram showing another embodiment of the present invention which is applied to the circuit diagram of FIG. 4.

In the above-mentioned embodiments, saturable reactors other than the reactor $6_{a5}$ in the AC circuit utilizes the process where the magnetic flux density decreases along the B-H characteristic curve, too. However, since the usual magnetic material (iron core) has a hysterisis characteristic, the reduction of magnetic flux is small. In such a case, it is effective to form a space gap in the iron core, in order to effectively utilize the magnetic material. An alternate method is such that, in addition to the main winding, the reactor is further provided with an auxiliary winding through which a magnetic exciting current flows with reverse polarity. Further, the method using saturable reactors as in the above-mentioned embodiment may be modified to insert the saturable reactors into the respective rectifier circuits, in the case where the power converter is comprised of a plurality of rectifier circuits as shown in FIG. 4. However, the high frequency components may be reduced, if at least one rectifier circuit includes saturable reactors, such as, for example, $6_{a1}$ to $6_{a5}$ inserted into the rectifier circuit $3_a$, as shown in FIG. 10.

Figure 11:
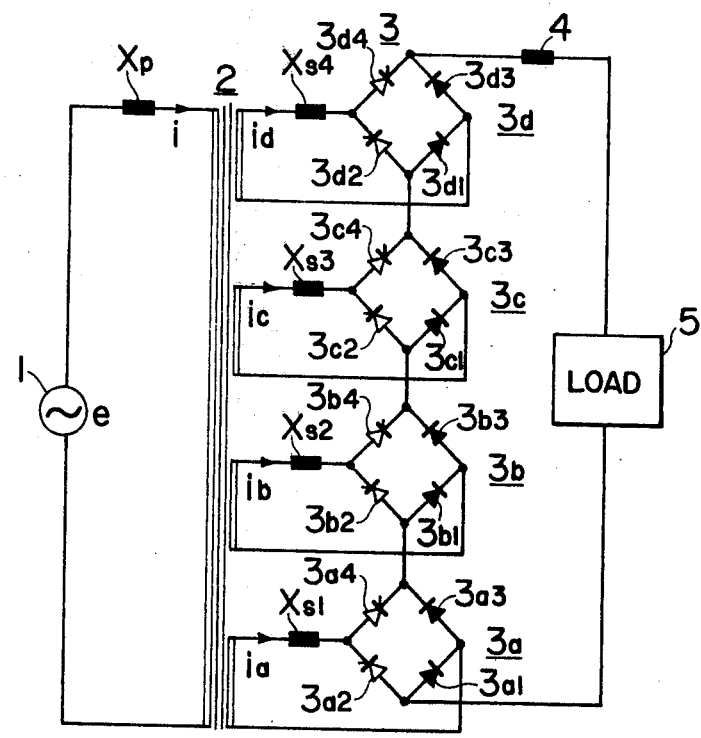
FIG. 11 is a circuit diagram showing still another embodiment of the present invention which is applied to the circuit of FIG. 4.

An explanation will be made with reference to FIG. 11 of another embodiment in which the present invention is applied to the converter comprising a plurality of rectifier circuits as shown in FIG. 4. FIG. 11 shows an example of the converter using four sets of rectifier circuits $3_a$ to $3_d$ each set of rectifier circuits comprising thyristors and diodes in bridge connection. More specifically, the rectifier circuit $3_a$ is constructed by thyristors $3_{a2}$ and $3_{a4}$, and diodes $3_{a1}$ and $3_{a3}$ these being connected in bridge fashion, the rectifier circuit $3_b$ by thyristors $3_{b2}$ and $3_{b4}$ and diodes $3_{b1}$ and $3_{b3}$ these also being connected in bridge fashion, the rectifier circuit $3_c$ by bridge-connected thyristors $3_{c2}$ and $3_{c4}$ and diodes $3_{c1}$ and $3_{c3}$, and the rectifier circuit $3_d$ by bridge-connected thyristors $3_{d2}$ and $3_{d4}$ and diodes $3_{d1}$ and $3_{d3}$. $X_{s1}$ through $X_{s4}$ designate reactances between the respective rectifier circuits and the secondary side of the transformer 2.

Figure 12:
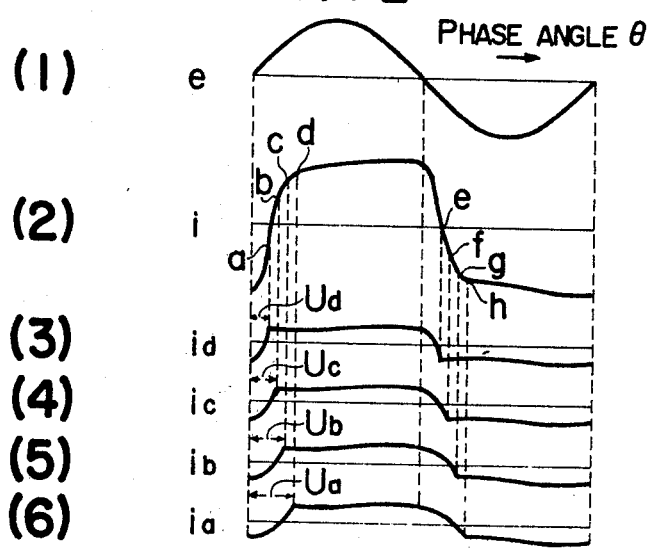
FIGS. 12, 13 and 14 are diagrams for explaining the operation of the device of FIG. 11.

In this embodiment, the reactances $X_{s1}$, $X_{s2}$, $X_{s3}$, and $X_{s4}$ in the AC circuit sides of the respective rectifier circuits $3_a$-$3_d$ are designed to have different values. In this case, when the four rectifiers are fired at the same time, the current change in the AC circuit is slower and the time until the commutation is completed is longer, as the reactance of the AC circuit is larger. FIG. 12 shows a set of AC current waveforms when the control angles of the four rectifier circuits are zero under a condition of $X_{s1} > X_{s2} > X_{s3} > X_{s4}$. As seen from the figure, the respective rectifier circuits initiate to commutate at the zero of the phase angle. However, the times required until the commutation is completed of the respective rectifier circuits $3_a$ to $3_d$ are different as designated by $U_a$ to $U_d$. Accordingly, there is produced a difference among the AC current components $i_a$ to $i_d$ included in the AC current $i$, and there are produced four small obtuse angles at the portions of $a$, $b$, $c$, and $d$, and of $a'$, $b'$, $c'$ and $d'$ of the AC current composing those AC current components. As a result, high harmonic components of the AC current $i$ are remarkably reduced.

The equivalent interference current in an actual circuit is measured for purpose of ascertaining the effects of the embodiment. The measurement is made under the following conditions: The power source voltage is 200 V; the turn ratio of the primary to the secondary winding of the transformer is 2:1; an average inductance of the reactors is 148 mH; the load is a DC motor; an average load current is 10 A; and, for 0.299 of the reactance at the primary side of the transformer, the condition of the conventional circuit is $X_{s1} = X_{s2} = X_{s3} = X_{s4} = 3.15 \Omega$, and the condition of the circuit of the present invention is $X_{s1} = 5.4 \Omega$, $X_{s2} = 3.8 \Omega$, $X_{s3} = 2.6 \Omega$, and $X_{s4} = 0.85 \Omega$. Accordingly, the total reactance at the secondary side of the transformer of the conventional circuit is substantially the same as that of the instant embodiment. Under such conditions, when the control angles of the rectifier circuits were zero, the equivalent interference current included in the AC current was 0.44 A for the conventional circuit while 0.32 A for the instant embodiment. This evidently shows the effect of the present invention.

As described above, the effect of the instant embodiment is attained due to the fact that the commutating periods of a plurality of rectifier circuits are different. The commutating period is also called the overlapping period. The overlapping period $U$ is given as:

$$\cos \alpha - \cos(\alpha + U) = k \frac{X_{ac} I_{dc}}{E_{ac}} \quad (3)$$

where $\alpha$ shows controll angle, $X_{ac}$ reactance of the AC circuit, $I_{dc}$ load current, $E_{ac}$ effective value of AC voltage, and $k$ is a proportional coefficient.

As seen from this equation, if the control angle is constant, the overlapping angle changes depending on $$\frac{X_{ac} I_{dc}}{E_{ac}}.$$

That is, the overlapping angle depends on the percentage reactance. Accordingly, the basic idea of the present embodiment resides in that the reactances of the AC circuit of a plurality of converters are different.

Figure 13:
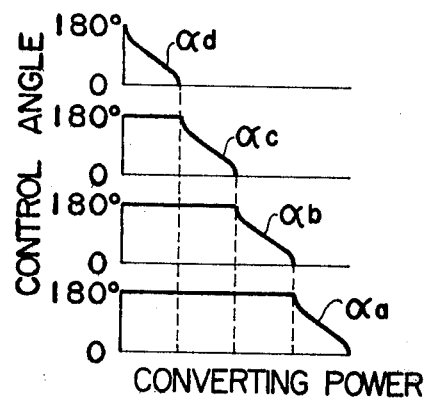
Figure 14:
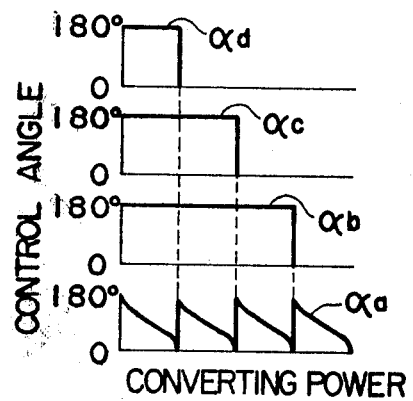

FIGS. 13 and 14 show desired methods of the sequential phase control of the respective rectifier circuits $3_a$ to $3_d$. FIG. 13 shows a method in which, when the control angles $\alpha_a$ to $\alpha_d$ of the respective rectifier circuits $3_a$ to $3_d$ are sequentially controlled, the control is made in order from the rectifier of the small AC reactance to that of the large AC reactance. Accordingly to this method, as the power to be converted is large and the AC current $i$ is large in amplitude, the square content components of the rectifiers of which the phase is under control, is reduced, so that high harmonic currents of the power source are almost totally reduced.

A method of FIG. 14 is such that the control angles $\alpha$ of the rectifier circuits of which the AC reactances are larger are continuously controlled, which the control angles $\alpha$ of the other rectifier circuits are switched merely between 180° and 0°. In this method, if the power conversion capacities of the respective rectifier circuits are equal, the discontinuous change of the converted power is prevented. On the other hand, since the rectifiers of which the control angles pass through the angle of 90° have a larger AC reactance, it is further effective in the reduction of high harmonic currents of a power source by using the method of FIG. 13.

Still another embodiment of the present invention using the circuit of FIG. 11 will be described with reference to FIGS. 15 and 16. The feature of this embodiment is that the control range of some of the rectifier circuits is different from that of the other rectifier circuits. In other words, when the control angles of the rectifier circuits are fixed, it is not so effected that all of the control angles are the same so that the reactances of the AC circuits at the time of commutation of the rectifier circuits are essentially changed.

For explaining the effect of the instant embodiment, the relationship between the control angles of the rectifier circuits and the AC current waveforms is described with reference to FIG. 16. In FIG. 16 $e$ and $i$ designate the voltage waveform and the current waveform of the AC power source 1, respectively. $i_a$, $i_b$, $i_c$ and $i_d$ are representatively the AC current components of the rectifier circuits $3_a$, $3_b$, $3_c$ and $3_d$, which are included in the AC current $i$. The state designated by $a$ in FIG. 16 is such that the control angles $\alpha_a$, $\alpha_c$ and $\alpha_d$ of the rectifier circuits $3_a$, $3_c$ and $3_d$ are fixed zero, and the control angle $\alpha_b$ of the rectifier circuit $3_b$ is under control. Particularly, this state is in such a condition that the control angle $\alpha_b$ is the same as an angle when the commutation of the rectifier circuit has been completed. The state of $b$ in FIG. 16 is the case where the control angles of all of the rectifier circuits are zero. Comparing these states $a$ and $b$, the power source current in the state $a$ is more square in waveform than that in the state $b$. Actually, frequency analysis of such waveform shows that high harmonic components in the state $b$ are larger than those in the state $a$.

The reason why high harmonic components of AC current in the state $a$ are smaller than that in the state $b$ is that the current $i$ during the commutation of the rectifier circuit changes in two steps. The AC terminals of the rectifier circuit during the period of commutation are shortcircuited by the diodes. In the case of the state $a$, three rectifier circuits $3_a$, $3_c$ and $3_d$ are first fired at the phase angle zero, and, as soon as the commutation is completed, the remaining one rectifier circuit $3_b$ starts to commutate at the phase angle $\alpha_b$. The change of the current $i$ when one rectifier circuit $3_b$ commutates is slower than that when three rectifier circuits $3_a$, $3_b$, and $3_d$ commutate at the same time. For this such reason, the power source current during the commutation period in the state $a$ changes in two steps so that high harmonic components included in the AC current are reduced as a whole.

Figure 15:
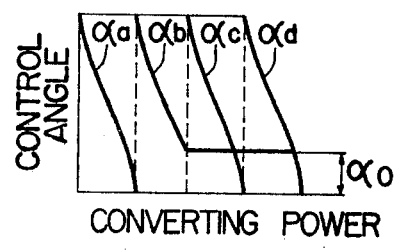
FIGS. 15 and 16 illustrate graphs for explaining the operation of yet another embodiment of the present invention which is applied to the circuit of FIG. 4.
Figure 16:
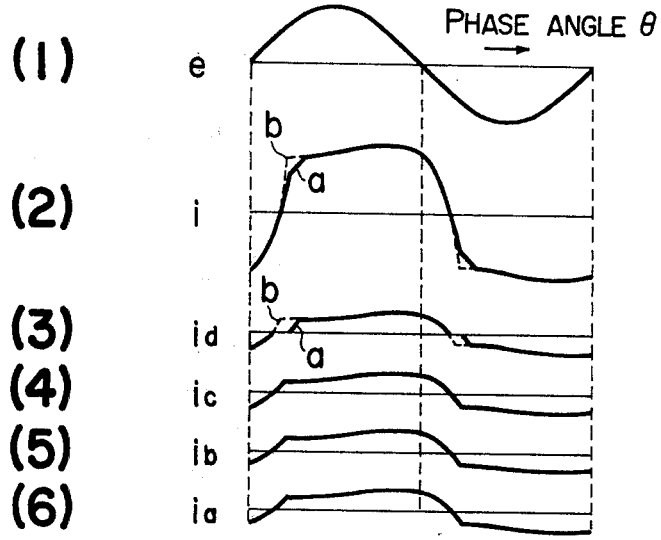

FIG. 15 illustrates an example of control angle characteristic in the instant embodiment. As illustrated in this figure, the control angles $\alpha_a$, $\alpha_b$, $\alpha_c$ and $\alpha_d$ of the rectifier circuits $3_a$, $3_b$, $3_c$ and $3_d$ are sequentially controlled one by one. This manner of control is the same as that of the prior art one. A difference of this embodiment from the prior art is that one control angle $\alpha_b$ is not less than a phase angle $\alpha_o$ which is larger than zero. In this manner, the phase angle $\alpha_a$ and $\alpha_b$ are controlled in order, and the power source current changes in the same change as that of the prior art until the control angle $\alpha_b$ reaches the phase angle $\alpha_o$ but it then traces a different change.

Figure 17:
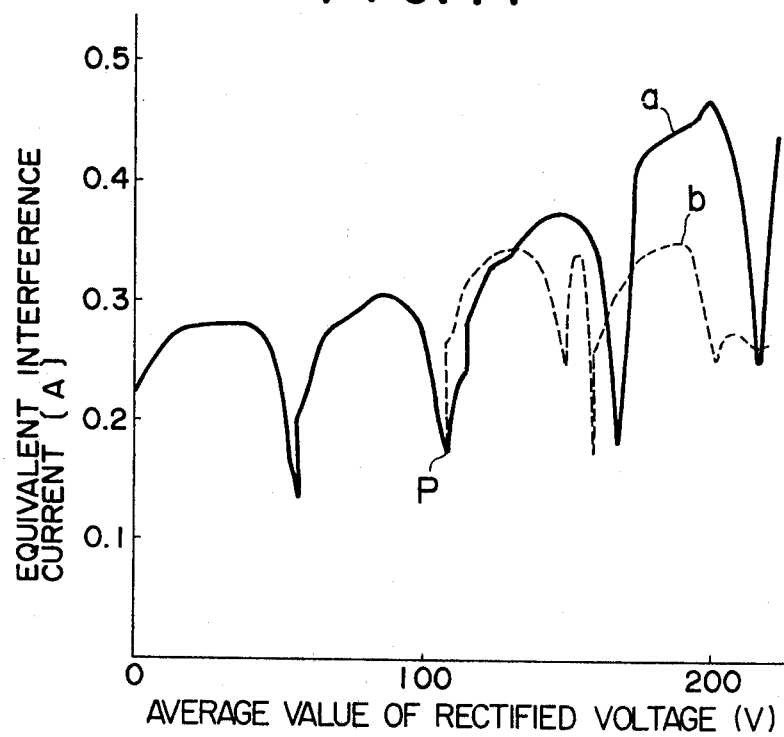
FIG. 17 is a graph showing measurements of the characteristic of the embodiment described with reference to FIGS. 15 and 16.

FIG. 17 shows measurements illustrating such a difference. In FIG. 17, $a$ shows the characteristic of the prior art, and $b$ shows the characteristic of the instant embodiment. There is no difference between the present embodiment and the prior art in the range on the left hand side of the point $p$, i.e., in the range where the average value of the rectified voltage is small. In the range on the right hand side of the point $p$, i.e. where the average value of the rectified voltage is large, however, the equivalent interference current $J_P$ is more reduced than that of prior art.

While the embodiments of the present invention have been described by using a single phase rectifier circuit, it will be understood that the present invention is applicable to various converting circuits in which commutation of a converting circuit using a rectifier is effected by an AC voltage, such as polyphase rectifier circuits.

We claim:

1. A high harmonic current reducing apparatus in a power converter comprising:
   a single phase AC power source;
   a transformer having a primary winding connected to said AC power source and a plurality of secondary windings;
   converting means comprising a plurality of single phase bridge rectifier circuits each including at least a plurality of controlled rectifiers, said rectifier circuits having AC input terminals connected with said secondary windings respectively and DC output terminals connected in series with each other;
   wherein an AC reactance of at least one of said rectifier circuits, as viewed from the DC output terminal thereof to the secondary winding, is different in value from AC reactances of the remaining rectifier circuits, as viewed from the DC output terminals thereof to the secondary windings, thereby reducing high harmonic currents.

2. An apparatus according to claim 1, wherein said at least one rectifier circuit having a different AC reactance includes at least one saturable reactor connected in series with respective rectifiers included therein.

3. An apparatus according to claim 1, further comprising reactors respectively provided between said rectifier circuits and the corresponding secondary windings connected thereto, each of said reactors having a different reactance value than the other reactors.

4. A high harmonic current reducing apparatus in a power converter comprising:
- a single phase AC power source;
- a transformer having a primary winding connected to said power source and a plurality of secondary windings;
- converting means comprising a plurality of single phase bridge rectifier circuits, each including at least a plurality of controlled rectifiers, said rectifier circuits having AC input terminals connected with said secondary windings respectively and DC output terminals connected in series with each other;
- gate controlling means connected with said converter means for sequentially controlling control angles of said rectifier circuits to continuously change each of said control angles and to fix the value of the control angle of at least one of said rectifier circuits to an angle value different from those of the remaining rectifier circuits, whereby an AC reactance of said at least one rectifier circuit substantially differs from those of the remaining rectifier circuits.

5. A high harmonic current reducing apparatus in a power converter comprising:
- a single phase AC power source;
- a transformer having a primary winding connected to said power source and a plurality of secondary windings;
- converting means comprising a plurality of single phase bridge rectifier circuits, each including at least a plurality of controlled rectifiers, said rectifier circuits having AC input terminals connected with said secondary windings respectively and DC output terminals connected in series with each other;
- gate controlling means connected with said converter means for sequentially controlling control angles of said rectifier circuits to continuously change each of said control angles;
- wherein an AC reactance of at least one of said rectifier circuits, as viewed from the DC output terminal thereof to the secondary winding, is different in value from AC reactances of the remaining rectifier circuits, as viewed from the DC output terminals thereof to the secondary windings.

* * * * *